(12) United States Patent
Bouman

(10) Patent No.: US 11,801,761 B2
(45) Date of Patent: Oct. 31, 2023

(54) CHARGING SYSTEM FOR ELECTRIC VEHICLES

(71) Applicant: ABB B.V., Rotterdam (NL)

(72) Inventor: Crijn Bouman, The Hague (NL)

(73) Assignee: ABB B.V., Rotterdam (NL)

( * ) Notice: Subject to any disclaimer, the term of this patent is extended or adjusted under 35 U.S.C. 154(b) by 0 days.

(21) Appl. No.: 15/933,757

(22) Filed: Mar. 23, 2018

(65) Prior Publication Data
US 2018/0212438 A1 Jul. 26, 2018

Related U.S. Application Data

(63) Continuation of application No. 13/678,073, filed on Nov. 15, 2012, now abandoned, which is a
(Continued)

(30) Foreign Application Priority Data

May 19, 2010 (NL) ...................... 2004746

(51) Int. Cl.
*H02J 7/00* (2006.01)
*B60L 53/10* (2019.01)
(Continued)

(52) U.S. Cl.
CPC .............. *B60L 53/11* (2019.02); *B60L 53/20* (2019.02); *B60L 53/302* (2019.02); *B60L 53/53* (2019.02); *B60L 53/55* (2019.02); *B60L 53/56* (2019.02); *B60L 53/63* (2019.02); *B60L 53/67* (2019.02); *H02J 5/00* (2013.01); *H02J 7/00* (2013.01); *H02J 7/0019* (2013.01); *H02J 7/02* (2013.01); *H02J 2310/48* (2020.01); *Y02E 60/00* (2013.01); *Y02T 10/70* (2013.01); *Y02T 10/7072* (2013.01);
(Continued)

(58) Field of Classification Search
CPC ...... H02J 7/007; H02J 7/04; H02J 7/02; H02J 7/00; H02J 7/0027; H02J 5/00; B60L 11/18; B60L 11/1844; B60L 11/1811; B60L 11/1824; B60L 2230/30; B60L 2230/26; Y02T 10/92; Y02T 10/7088; Y02T 10/7055; Y02T 90/121; Y02T 90/127; Y02T 90/128; Y02T 90/14; Y02T 90/163; Y02T 90/168; Y02E 60/721; Y04S 30/12
USPC .............................................. 320/109; 307/62
See application file for complete search history.

(56) References Cited

U.S. PATENT DOCUMENTS 5,926,004 A * 7/1999 Henze ..................... H02J 50/12
320/109
7,256,516 B2 * 8/2007 Buchanan ................. H02J 1/14
307/62
(Continued)

FOREIGN PATENT DOCUMENTS

JP H04-358950 A 12/1992
WO 01/97360 A2 12/2001

*Primary Examiner* — Arun C Williams
(74) *Attorney, Agent, or Firm* — Greenberg Traurig, LLP

(57) ABSTRACT

A charging system for electric vehicles is disclosed, which includes at least one charging port with an interface for power exchange with at least one electric vehicle, and at least one power converter for converting power from a power source such as a power grid to a suitable format for charging the vehicle. The power converter can be at a remote location from the charging port, such as a separate room, and/or a separate building.

23 Claims, 10 Drawing Sheets

Related U.S. Application Data continuation of application No. PCT/NL2011/050341, filed on May 18, 2011.

(51) Int. Cl.
*H02J 5/00* (2016.01)
*B60L 53/53* (2019.01)
*B60L 53/63* (2019.01)
*B60L 53/55* (2019.01)
*B60L 53/56* (2019.01)
*B60L 53/20* (2019.01)
*B60L 53/67* (2019.01)
*B60L 53/302* (2019.01)
*H02J 7/02* (2016.01)

(52) U.S. Cl.
CPC ............... *Y02T 10/92* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/12* (2013.01)

(56) References Cited

U.S. PATENT DOCUMENTS

| | | | | |
|---|---|---|---|---|
| 8,314,511 B2* | 11/2012 | Schuler | ............... | H02J 7/04 307/31 |
| 2002/0104323 A1* | 8/2002 | Rash | ............... | F24F 11/30 62/176.1 |
| 2004/0130288 A1* | 7/2004 | Souther | ............... | B60L 58/10 320/104 |
| 2008/0197811 A1* | 8/2008 | Hartular | ............... | H02J 7/04 320/141 |
| 2010/0017249 A1* | 1/2010 | Fincham | ............... | B60L 3/12 705/412 |
| 2010/0066170 A1* | 3/2010 | Schuler | ............... | H02J 9/002 307/31 |
| 2010/0094496 A1* | 4/2010 | Hershkovitz | ............... | B60L 58/12 701/22 |
| 2010/0106631 A1* | 4/2010 | Kurayama | ............... | G06Q 30/04 320/109 |
| 2010/0277121 A1* | 11/2010 | Hall | ............... | H02J 50/90 320/108 |
| 2011/0221387 A1* | 9/2011 | Steigerwald | ............... | B60L 53/60 320/108 |

* cited by examiner

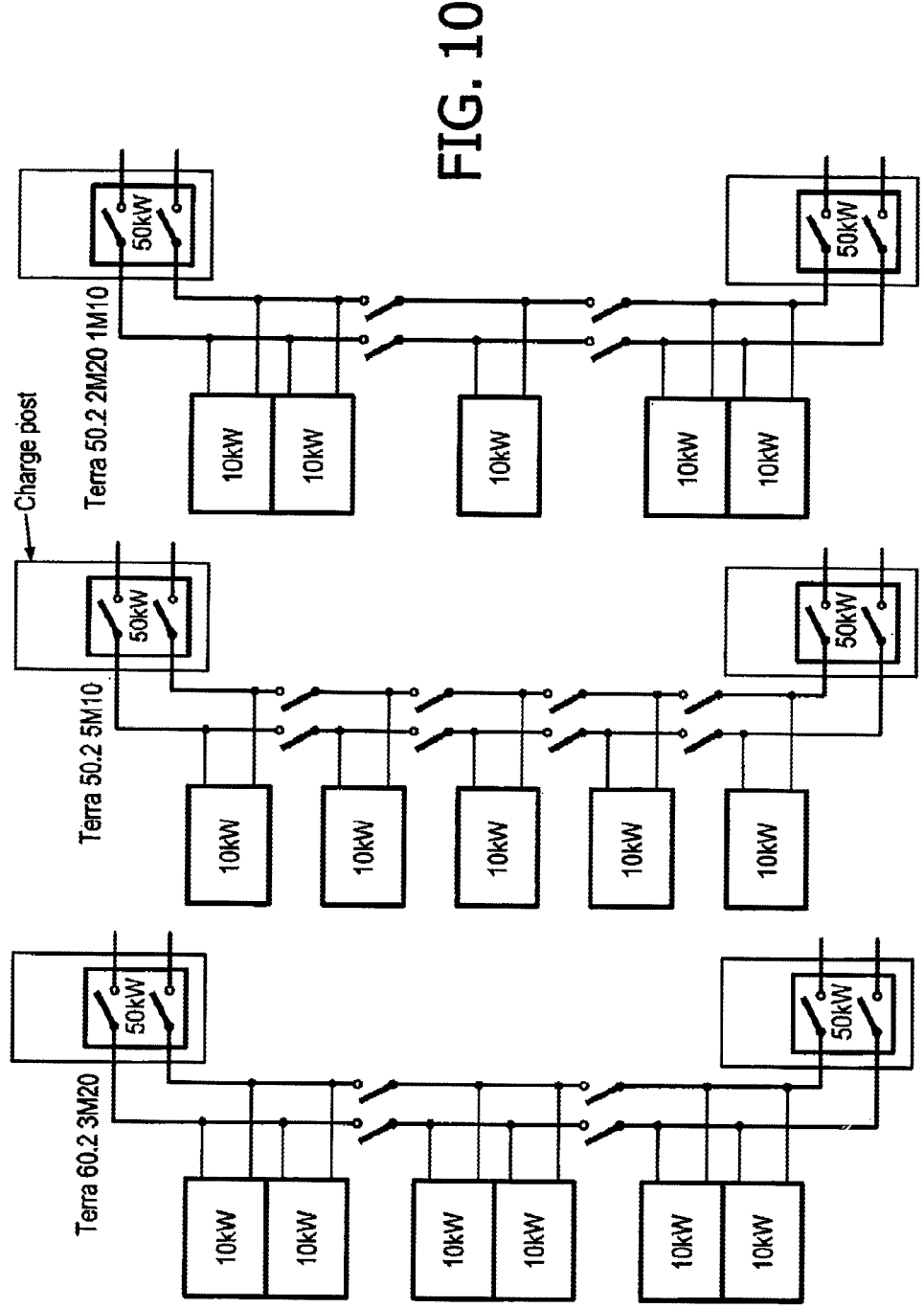

CHARGING SYSTEM FOR ELECTRIC VEHICLES

RELATED APPLICATION(S)

This application claims priority as a continuation application under 35 U.S.C. § 120 to PCT/NL2011/050341, which was filed as an International Application on May 18, 2011, designating the U.S., and which claims priority to Dutch Application No. 2004746 filed on May 19, 2010. The entire contents of these applications are hereby incorporated by reference in their entireties.

FIELD

The present disclosure relates to a charging system for electric vehicles, and for example, a setting wherein multiple vehicles can be charged, such as, at a filling station for vehicles with combustion engines.

BACKGROUND

With a growing popularity of electric vehicles, the need for charging stations increases, and so does the total power available for each charging port, and in case of multiple ports, their total power consumption.

Large power consumption uses power converters with increasing power capacity, and as a result, larger cooling facilities can be used to prevent damage from overheating of their components. With a (forced) cooling facility for each energy exchange port, the charging system (or charging station) would become a noisy environment, with a low energy efficiency. Thus, the present disclosure provides a charging system with multiple ports for this purpose.

Charging stations with a plurality of charge ports are known. One way of implementing a plurality of charge ports can be by using an AC/DC converter followed by a DC bus where the charge ports are connected to. However, in such an arrangement, multiple vehicles cannot be charged simultaneously, because each vehicle can have a different inlet voltage. To be able to charge electric vehicles simultaneously DC/DC converters are placed before each charging port, which can increase the cost of the multipart charging station.

SUMMARY

A charging system for electric vehicles is disclosed, comprising: a plurality of charging ports, each with an interface for power exchange with at least one electric vehicle; a plurality of power converters for converting power from a power source to a desired format for charging the vehicle; a switchable connection matrix for connecting at least one power converter to at least one charging port; at least one controller for controlling at least one of the power converters, and/or for controlling the switching operations of the connection matrix and at least one power converter; and communication means for exchanging parameters with the at least one electric vehicle.

A method for operating a switchable connection matrix is disclosed, comprising: (a) assigning for connecting at least one power converter at least one charging port having an interface for power exchange with a vehicle, the method for charging a vehicle to a priority to each charging port based on at least one parameter; (b) determining power requested on each charging port; (c) distributing power modules among the charging ports based on the priority and the requested power; and (d) repeating steps of (a)-(c).

BRIEF DESCRIPTION OF THE DRAWINGS

The disclosure will be explained hereinafter on the basis of the exemplary embodiments illustrated in the drawings, in which:

FIG. 10 shows an exemplary implementation of the disclosure.

DETAILED DESCRIPTION

Figure 1A:
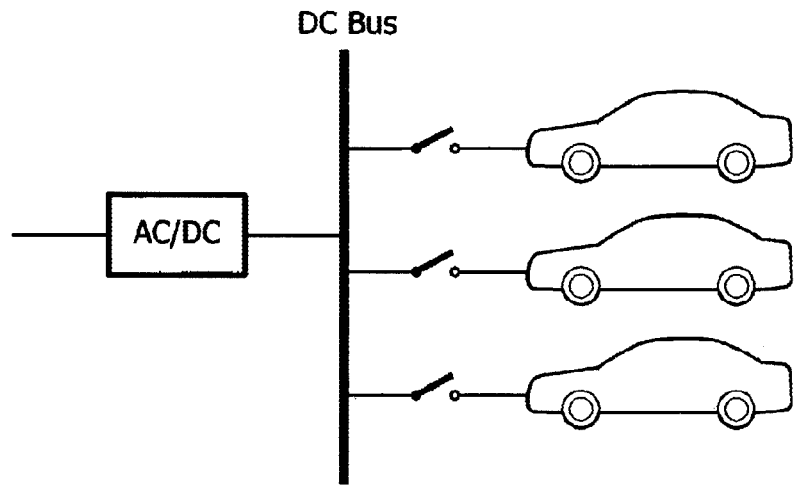
FIG. 1a shows a known charging station with a plurality of charging ports.

In accordance with an exemplary embodiment, a multiport (at least one, for example, several ports) system is disclosed, which can improve functionality with less hardware, and which can be relatively easier and cheaper to upgrade with extra connections.

In accordance with an exemplary embodiment, a charging system for electric vehicles is disclosed, which includes a plurality of charging ports, each of the plurality of charging ports having an interface for power exchange with at least one electric vehicle, a plurality of power converters for converting power from a power source such as a power grid to a suitable format for charging the vehicle, a switchable connection matrix for connecting at least one power converter to at least one charging port, at least one controller for controlling at least one of the power converters, and/or for controlling the switching operations of the connection matrix and the power converter, and communication means, for exchanging parameters with the at least one electric vehicle.

In an exemplary embodiment, the power converters and the connection matrix are at a remote location from the charging port, for example, a separate room and/or a separate building.

In accordance with another exemplary embodiment, by having the power converter at a remote location it can be relatively easier to upgrade the system with more power (no digging needed), the energy exchange ports are relatively easier to fit into a user situation, and there are less technical requirements, for example, regarding size, on the power converter, if it is placed in a conditioned room. The charging location will also not be disturbed during the expansion of the charging capacity.

For example, the switchable connection matrix can be implemented in order to couple each charging port simultaneously to a number of the plurality of converters, in such a way that at most one port is connected to a converter. For example, the matrix allows each charging port to be connected simultaneously to one or more power converters, or none. In exemplary embodiments, the converters can be connected to at most one charge port at the same time.

The present disclosure also provides that the power converters, matrix and the charge ports can be expanded independently from each other, and the number of charge ports and power modules do not have to be equal when the charge station is expanded. For example, a charge station may be installed at a location and can be expanded or even downgraded depending on how frequently the charge station is used. For example, one scenario could be that the charge station is not used very frequently, and because it is at a remote location from other stations the vehicles that arrive will have low state of charge. In this case, a charge station with one charge port and a high power capacity is needed. For example, through time a new city is built nearby, which can result in more electric vehicles visiting the charge post with a medium state of charge.

Accordingly, it would be desirable to modify the charge station then into a configuration with more charge posts and with the same or a smaller power capacity. For example, the present disclosure can be used within the setting described in the Dutch patent application NL 2004279, which is incorporated by reference in its entirety, which will enable the disclosure to log the charging sessions. Based on the logged charging sessions the server can decide to change the power capacity or the number of charging ports. The present disclosure also provides that the charging ports do not have a common ground, which provides that when more than one electric vehicle can be connected to the charger they will be galvanicly isolated, which is often desired by the EV manufacturers. In addition, galvanic isolation between the vehicles having more than one isolation monitor in the same circuit can decrease the sensitivity of the isolation monitor.

In accordance with an exemplary embodiment, at the energy exchange port, where the user charges his vehicle, there can be less noise, visual disturbance or (warm) air inconvenience.

In accordance with another exemplary embodiment, the system according to the disclosure can become more efficient when the remote location comprises a plurality of power converters. For example, the converters share (part of) the cooling system and location, they can be designed modular, and the total converter can be fit to the total power needed for all of the ports.

In an exemplary embodiment, the remote location comprises climate conditioning, such as an air- or a liquid based cooling system, a heat pump system and/or a heat exchange system, which removes heat away from the power converters, or to heat systems inside the conditioned room if the temperature drops below a certain threshold. The cooling system may be a fan that blows air in or out of the conditioned room. Also the cooling system may be a two-part system, such as a heat-pump system. The heat can be extracted from the power converters or the room and transported (e.g. by fluid or air) to a second part of the cooling system outside the conditioned room. For example, in this way the power converter system can be upgraded easier.

In accordance with another exemplary embodiment, such a second part of the heat-pump system serves to exchange the heat with the outside world, and can be on top of a charging station's roof or a building (shop) near the charging station to prevent noise and hot air to annoy users.

For example, the cooling may be a part of or placed on a transformer house. The heat from the power converters can be used for other purposes, such as heating of a building or heating of water. The heat may be transferred into storage, such as a hot water tank or an under-ground heat storage.

The conditioned room may be an industrial cabinet, a building, a part of a building or a service room (e.g., only accessible to authorized personnel), or it may be that the conditioned room is not accessible through a door or has a door with a lock.

For example, the term conditioned here means amongst others that it can be shielded against at least rain or sun. The conditioned room may be one or more transformer houses/buildings. The conditioned room may have separate compartments for the grid connected transformer and the power converters or a transformer house may be used without the transformer. Also two houses can be used, one with a transformer and another with the power converters.

The conditioned room may be, for example, at least 2 metres away from at least one of the posts. The conditioned room may be under ground, on a roof and it may be characterized by the fact that it provides a shell that increases International Protection rating (as defined in international standard IEC 60529) of the system. For example, this may be because openings in the conditioned room's walls are smaller than openings in the power converters or that there is a spacing between the power converters and the conditioned room's walls to prevent people from touching the power converters.

The conditioned room may comprise an air-conditioning system and/or a heater. A high efficiency can be obtained when the climate conditioning is configured for direct operation on the converter or converters, rather than the entire room. The remote location may be a transformer house or form part thereof, and the converter(s) and the transformer may be located in separate rooms within the remote location.

Alternatively, the power converters may be placed outside or in case of a plurality of energy exchange ports, inside one of the ports or below (in the fundament of) one of the charging ports. For example, the term port can be used here to indicate both the functionality of exchanging energy with a vehicle, as the physical device, standing at the charging station.

The power converters may be unidirectional or multidirectional converters with one or more AC or DC inputs and one or more AC or DC outputs. In an exemplary embodiment these outputs can be independently controlled. For example, in the case of a single power converter the power converter will have at least two outputs. In the case of multiple power converters, the outputs of the converters will be connected to a connection matrix. The connection matrix has multiple inputs and multiple outputs. Various configurations of suitable power converters for the system according to the present disclosure are described in the Dutch patent application NL 2004279 by the same applicant, which is hereby incorporated by reference in its entirety.

The conditioned room may also contain one or more energy storage systems such as battery systems, capacitor systems, flywheels or any other system which can store energy. For example, these energy storage systems can be coupled to the power converters to deliver temporary peak power or to store electricity at a convenient moment. In an exemplary embodiment, the cooling system present in the conditioned room can be used to cool or heat the energy storage system or to maintain it at a certain defined temperature. For example, this can be beneficial for the life of the storage medium, especially in the case of batteries. The conditioned room or systems present in the conditioned room may also be heated when the temperature drops below a certain threshold.

In an exemplary embodiment, a number of power converters can be coupled to a number of charging ports by a switchable connection matrix, which may be located within the remote location. Such a connection matrix is also described in more detail in the Dutch patent application NL 2 004 279, which is hereby incorporated by reference it its entirety.

In an exemplary embodiment, the connection matrix has four output connections and can be designed to transfer a certain maximum amount of power per connection, for example, 50 kW. At the same time one power converter may be designed to deliver a maximum amount of power, for example, also 50 kW. When operational in the field, the matrix will receive a maximum, for example, of 50 kW from the converter and will distribute this 50 kW over the 4 outputs. When the power converter is upgraded by adding a second converter, also for example, with a power of 50 kW resulting in a 100 kW combined power. For example, the power limit of the connection matrix still remains 50 kW per connection. However, in this case, only the average power delivered by the 4 outputs will increase.

In another exemplary embodiment of above situation one can also upgrade the connection matrix to deliver more power per output, for example, 100 kW. This may be done by adding and/or replacing components (such as fuses) inside the connection matrix, or by totally replacing the connection matrix.

The charging system according to any of the above described embodiments, may comprise a controller, which is operated to control the amount of heat generated, in case the heat can be used for other purposes. Charging speeds of batteries may for instance be increased temporarily when heat, for example, in the form of hot water, may be needed by an external system. For example, the generated heat in that case can be controlled by controlling the output power.

Such a controller may be coupled to the converter(s), the connection manager(s), the connection matrix(s), and the energy storage system via the internet. The controller may optimize and influence the power flow to each output of the connection matrix based on local decision rules.

Furthermore, it may be equipped with at least one connection manager, said connection manager being configured to control safety settings of energy supply to at least one port. In accordance with an exemplary embodiment, each port comprises a connection manager, for example, one connection manager can serve a plurality of energy exchange ports.

The connection manager can be used to adapt a charging port for a charging standard such as CHAdeMO or J1772. For example, safety systems and communication hardware may be included in the communication manager. Such a connection manager can also be described in more detail in the Dutch patent application NL 2 004 350 by the same applicant, which is incorporated herein by reference in its entirety.

In accordance with an exemplary embodiment, the total system may also contain a special system or method to compensate for the length of the cable between the remote charging post and the conditioned room. As wires get longer the system can experience negative effects such as voltage drop over the cable. For example, the use of cables with a large diameter can be used to address the voltage drop over the cable. In some situations this may not be preferred because of the extra cost of thicker cables. Therefore another method could be used such as the use of a control system which controls the output voltage of the power converters based on the measured voltage close to the charging ports. For example, this could be implemented via a measurement device inside or close to the charging post, or even via a data communication link to a measurement device inside the vehicle, such as a BMS system.

In accordance with another exemplary embodiment, the method for operating the switching matrix comprises steps of assigning a priority to each port based on at least one parameter, determining the power requested on each port, distributing the power modules among the ports based on the priority and the requested power, repeating the aforementioned steps each time an event occurs.

In accordance with an exemplary embodiment, execution of the above mentioned method can be as follows. Each time an event occurs the controller starts with assigning a priority to each port of the charging station based on a parameter. Some non-limiting examples of an event are a vehicle which connects to or disconnects from a charging station, the power demand of the vehicle which changes substantially during the charging or when the user changes the charge preferences. For example, the parameter can be the time of arrival of the vehicle, the type of account the vehicle driver possesses, the time entered in the system by the user for preferred drive away. In accordance with an exemplary embodiment, the power requested on each port can be determined by the controller. The power modules are distributed among the ports based on the priority and the requested power by the ports.

An exemplary embodiment of a scenario wherein the above mentioned method can be applied is as follows. Vehicles couple to a charging station one by one. The vehicle which came the first gets the highest priority, and the vehicle which came the last the lowest priority. Based on the priority the first vehicle gets sufficient power modules to satisfy its power demand, the remaining modules (if there are any) are assigned to the other ports (vehicles) based on their priority.

In another exemplary embodiment, only a part of the modules are distributed according to the priority. For example, a number of the modules are distributed equally among the ports, the remaining modules are assigned according to the priority.

Figure 1B:
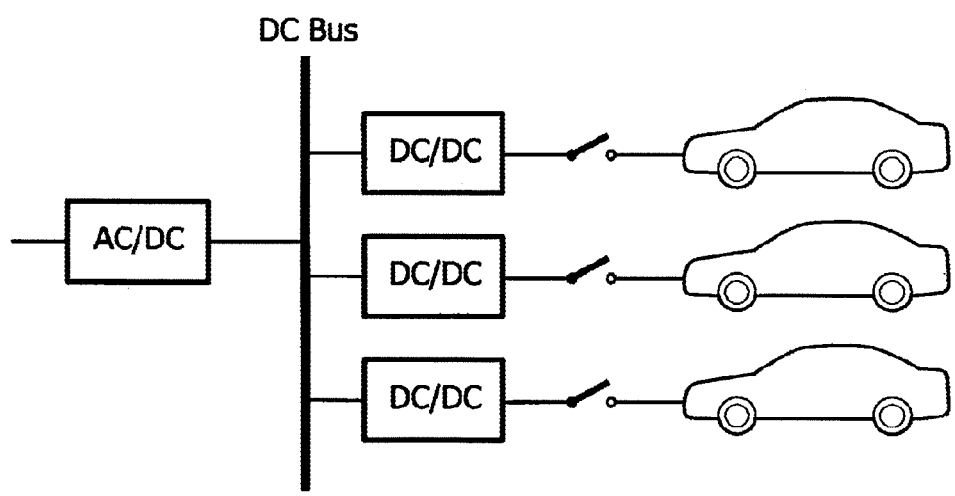
FIG. 1b shows a known charging station with a plurality of charging ports with different inlet voltages simultaneously.

FIG. 1a shows a charging station with a plurality of charge ports from known systems. The charging station, includes (e.g., consists of) an AC/DC converter followed by a DC bus and a plurality of switches are used where the charge ports and hence the vehicles are connected to. However, in the system as shown in FIG. 1a, multiple vehicles cannot be charged simultaneously, because each vehicle has a different voltage on its charging inlet. The known DC/DC converters used to charge electric vehicles with different inlet voltages simultaneously (FIG. 1b), can increase the cost of the multiport charging station.

Figure 1C:
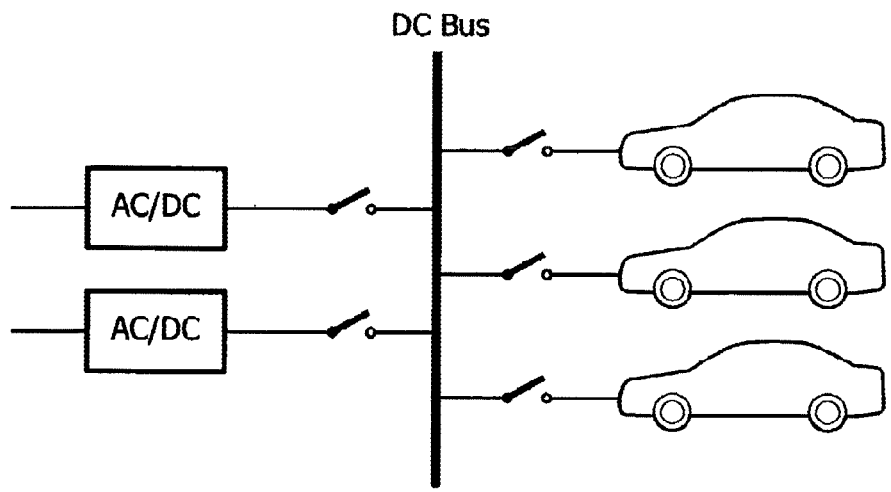
FIG. 1c shows a known charging station with multiple power converters.

FIG. 1c shows a charging station with multiple power converters from known systems. Although the power converter is modular and the power capacity can be expanded, multiple electric vehicles cannot be simultaneously charged.

Figure 1D:
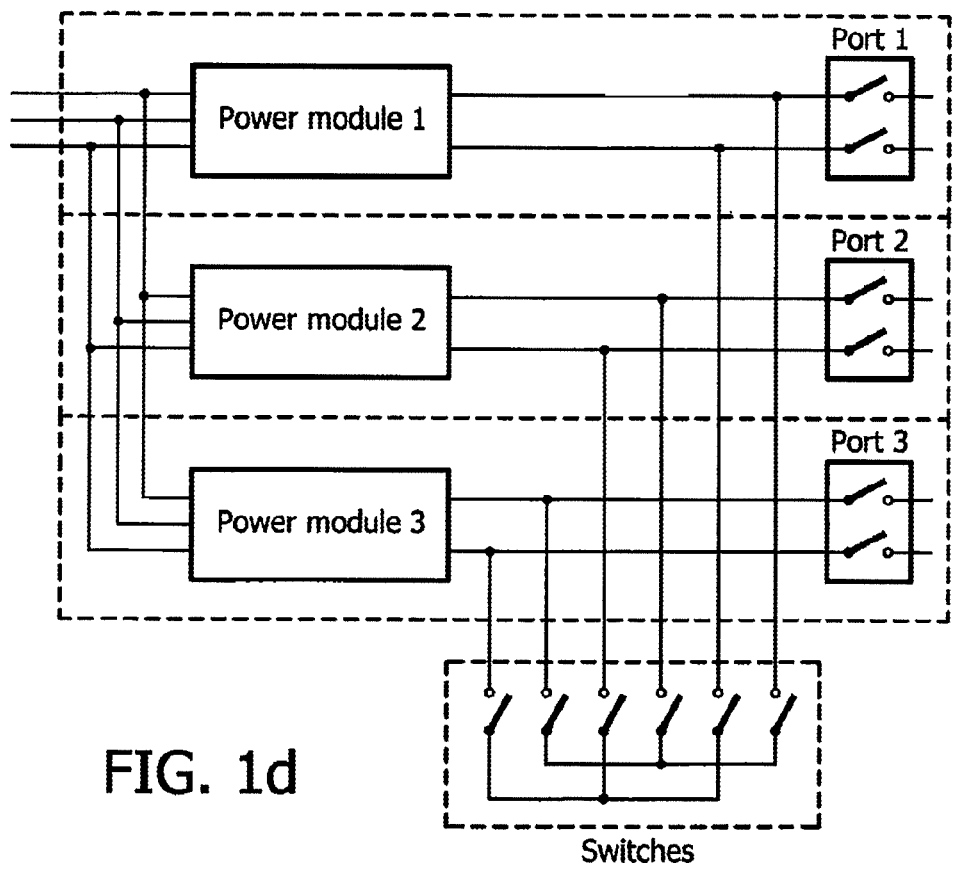
FIG. 1d shows a known multiport charging station.

FIG. 1d shows a multiport charging station known, wherein electric vehicles can be simultaneously charged from this charging station, since the hardware configuration of the number of charge ports are equal to the number of power modules.

Figure 2:
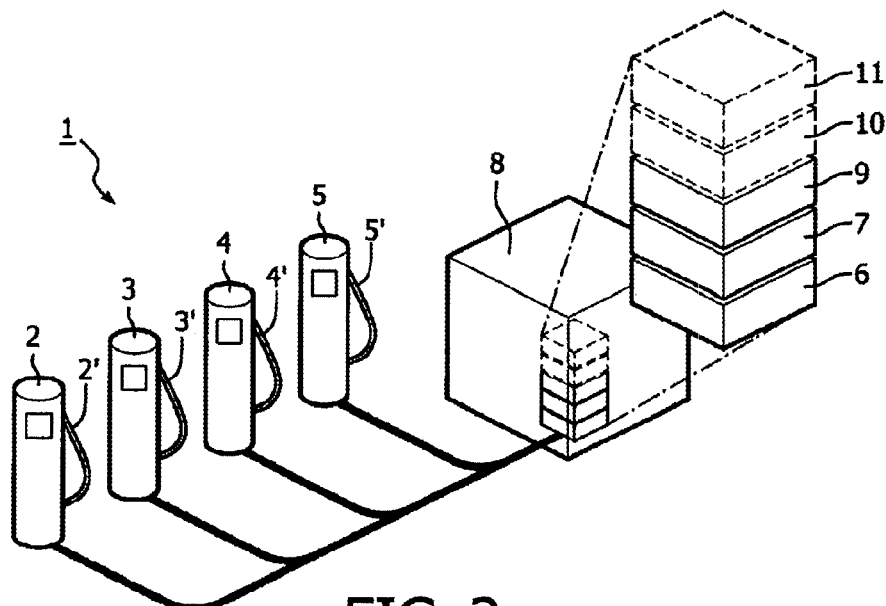
FIG. 2 shows an exemplary embodiment of a charging system according to the present disclosure.

FIG. 2 shows a first exemplary embodiment charging system 1 according to the present disclosure, comprising charging ports 2-5 with an interface 2'-5' for power exchange with at least one electric vehicle, power converters 6, 7, for converting power from a power source such as a power grid (not shown) to a suitable format for charging the vehicle. The power converters are at a remote location 8 from the charging ports 2-5, formed by a separate building 8.

The building 8 can include a connection box 9, which may comprise a plurality of connection managers, as well as vacancies 10 and 11, intended for future use, for example, when the power needed increases. In accordance with an exemplary embodiment, the charging system can be extended without modifications to the energy exchange ports.

Figure 3:
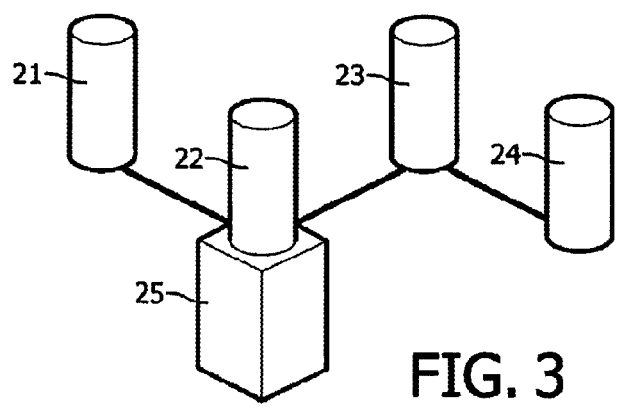
FIG. 3 shows another exemplary embodiment of a charging system according to the present disclosure.

FIG. 3 shows another exemplary embodiment 20 of a charging system according to the present disclosure, comprising energy exchange ports 21-24, wherein a power converter 25 can be located below one of the energy exchange ports 22.

Figure 4:
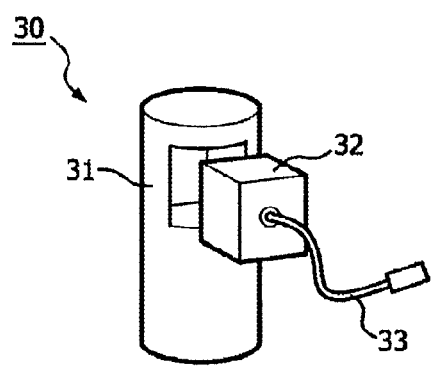
FIG. 4 shows another exemplary embodiment of a charging system according to the disclosure.

FIG. 4 shows an exemplary embodiment 30, wherein connection managers are placed inside a connection box 32 within the charging port 31, which connection box 32 also includes a controller. In accordance with this embodiment, the connection box 32 can be replaced entirely in case of an upgrade, for example, increasing the amount of connection managers. In addition, because the controller can be directly associated with the connection managers, the controller can be pre-programmed to cooperate with the correct number of connection managers.

Figures 5A, 5B:
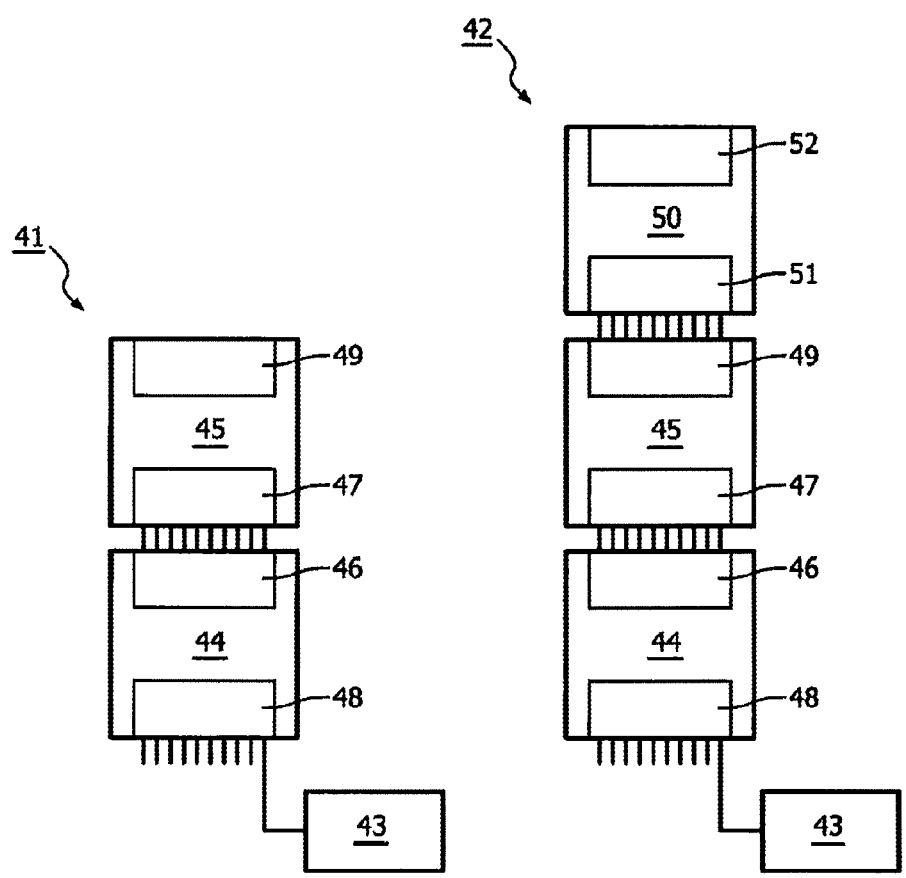
FIGS. 5a-5d show schematic views of an exemplary power system according to the present disclosure.

FIG. 5a shows an embodiment 41 of a charging port 43, to which a connection box 44 can be coupled via an interface 48. The connection box 44 comprises a second interface 46 which can be coupled with a corresponding interface 49 of a power converter 45. The power converter includes an interface 49 for coupling an additional power converter in case more power is needed.

FIG. 5b shows an embodiment 42 of the charging port 43 from FIG. 4a, which is now equipped with an additional power converter 50. The power converter 50 comprises an interface 51, and it furthermore can include an interface 52 for future coupling of further power converters.

Figure 5C:
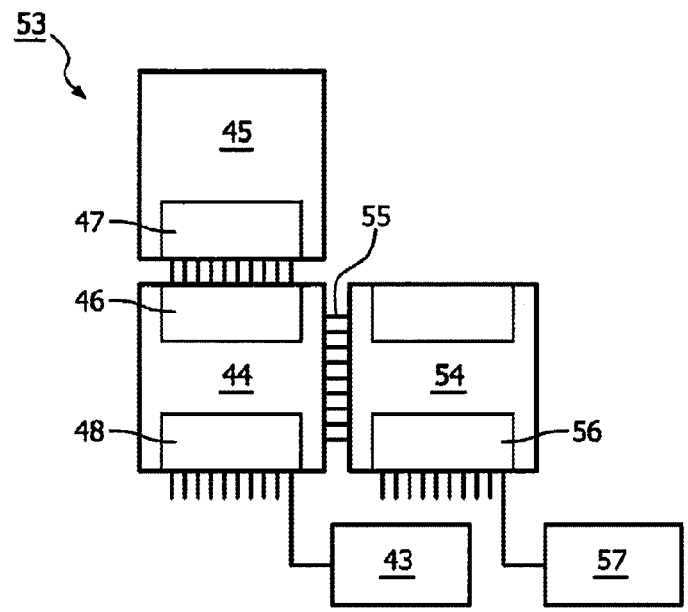

FIG. 5c shows another exemplary embodiment, wherein a second charging port 57 is present, which is coupled to an interface 56 of a second connection box 54, which is coupled 55 to the first connection box 44. In accordance with this embodiment, two charging ports 43, 57 can be powered by the same power converter 45.

Figure 5D:
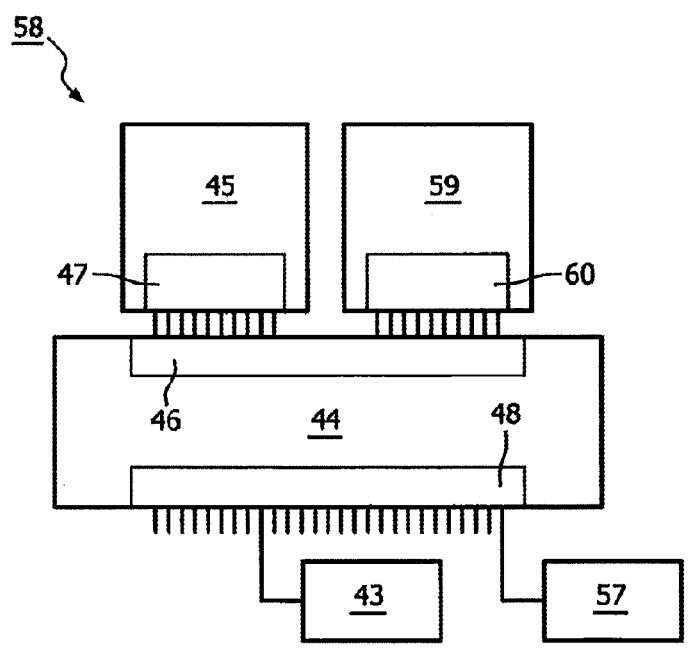

FIG. 5d shows still another exemplary embodiment, wherein charging ports 43 and 47 are both coupled to interface 48 of connection box 44, and can be switched to either power converter 45 or 59, which are coupled to the connection box 44 by respective interfaces 47, 60 and 46.

Figure 6A:
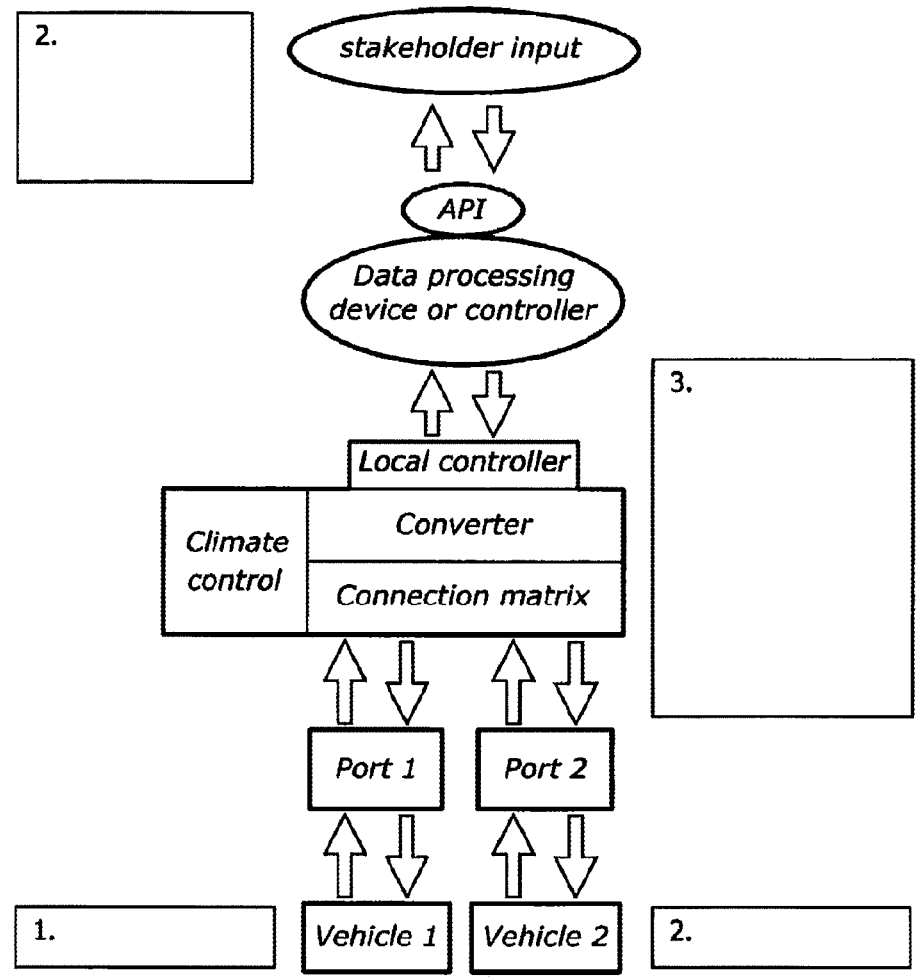
FIGS. 6a and 6b show flowcharts of an exemplary process flow according to the disclosure.

FIG. 6a shows an exemplary embodiment with a flowchart of use of the present disclosure. Firstly, a vehicle connects to energy exchange port 1. Secondly, a second vehicle connects to energy exchange port 2. At the same time, the stakeholder sends information to a data processing device or controller. For example, the stakeholder input can be battery data, grid data, service needs, etc. Thirdly, the data processing device together with controllers in the system decide on the best charging strategy and power distribution based on parameters such as the stakeholder input, the maximum power and specifications of the converter, the specifications of climate control, the specifications of the connection matrix, the specifications of the port, and the data known about the vehicles or their batteries and potential other data.

Figure 6B:
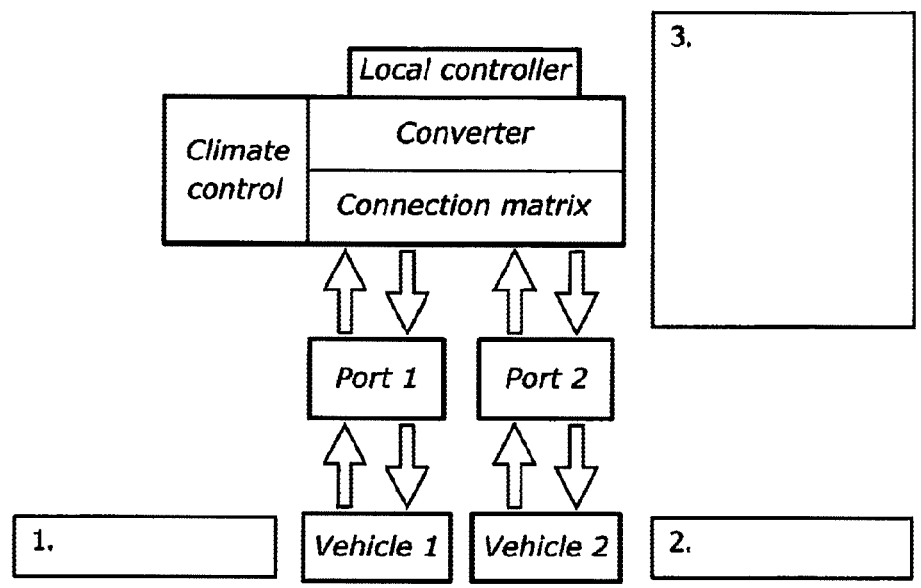

FIG. 6b shows another exemplary embodiment, wherein firstly a vehicle connects to the energy exchange port. Secondly, a second vehicle connects to the energy exchange port. Thirdly, the local controller in the system decides on the charging strategy and power distribution based on parameters such as the maximum power and specifications of the converter, the specifications of the connection matrix, the specifications of the climate control system, the specifications of the port, and the data known about the vehicles or their batteries and potential other data.

The connection manager may be part of the charging post. The connection manager and the cable and connector can be removed from the charging post to be replaced in one piece. When using a multiple output power converter system, with a lesser amount of charging posts, multiple outputs may be connected to a single connection manager. When upgrading to a higher number of charging posts, some of the connection may be split. In some cases a single connection manager can be connected to multiple charging posts or a single connection manager can be connected to a single charging post that has multiple connections (charge cable and charge connector).

In accordance with an exemplary embodiment, the charging post can be located at a distance from the power converters. For example, the charging posts can be placed next to one or more (parking) spots for vehicles, such as, at a fuel station/charging station or a shop. The charging posts can be indoors (e.g. parking garage). The charging post can be powered (from the power converters) from the bottom or from the top (not shown in image). Additionally AC power, for example for electronics inside the charging post or for an AC-charging outlet, may be available through the same or another connection.

The charging post can have a cable handling system and a feature to place the connector in a safe and dry location.

In accordance with another exemplary embodiment, a subsystem, such as a user-interface, payment terminal, user identification system, user input system or digital transmission system may be connected to communication line that is a part of the cable(s) that is connected to the charge post.

The energy exchange port can have one or multiple charge connectors, where the connectors may deliver either AC or DC charging current or both.

Figure 7:
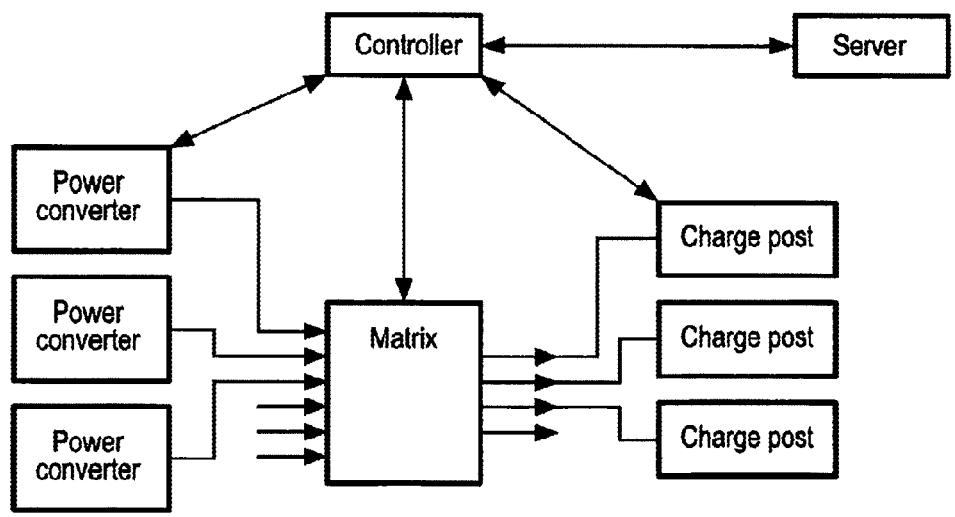
FIG. 7 shows another exemplary embodiment of the charging station.

FIG. 7 shows a charging system wherein a plurality of power converters are connected with charge ports by a switched connection matrix. By using a switched connection matrix multiple electric vehicles can be charged simultaneously, without the need of extra converters. The connection matrix can be controlled by a controller. Information about the charge session can be sent from the charging station to the server, whereupon the server can decide for expansion or downgrading the charging station. For example, the server or the controller can decide to switch off each of the converter modules or charging ports in case of malfunction.

Figure 8:
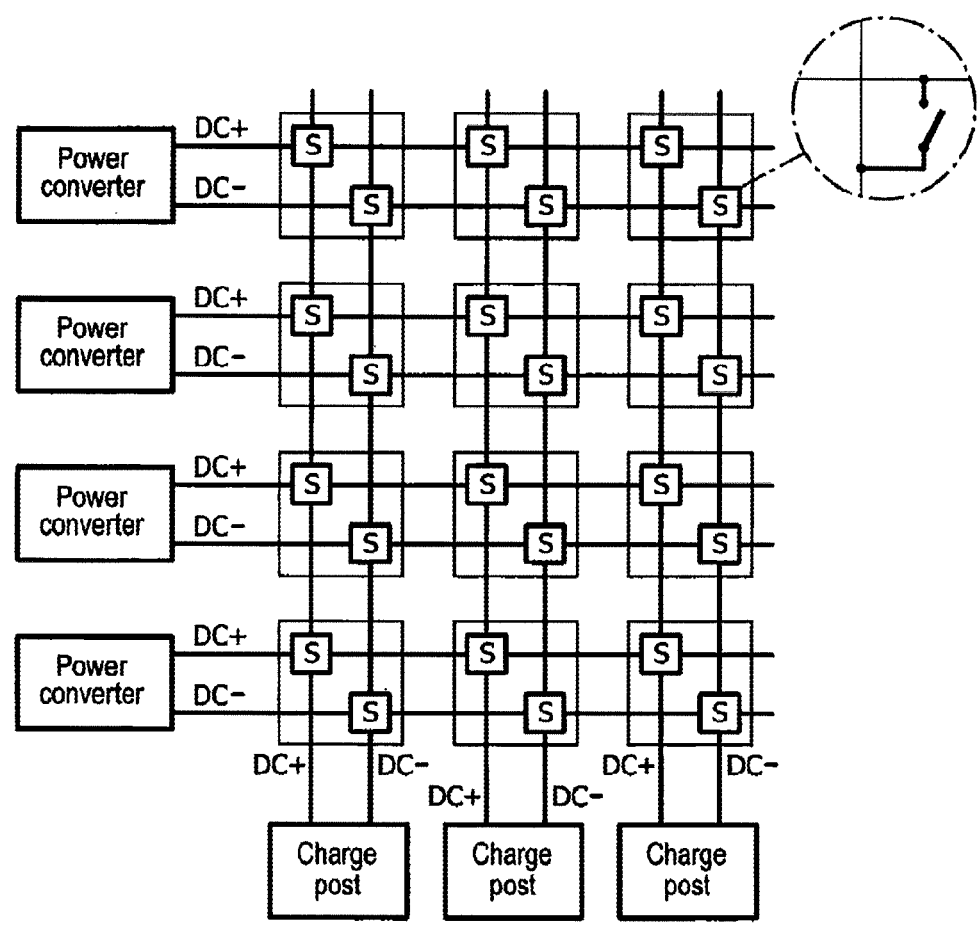
FIG. 8 shows a further exemplary embodiment with an exemplary implementation of the connection matrix.

FIG. 8 shows an exemplary embodiment of the connection matrix placed between the power converters and the charge posts. By closing the switches one or more power converters can be connected to a charge post. For example, the matrix can charge a plurality of electric vehicles simultaneously without extra DC/DC converters. To expand the number of power converters or the charge posts the matrix also can be expanded. The matrix can be extended by adding switch modules each containing two switches which are controlled by a local controller.

Figure 9:
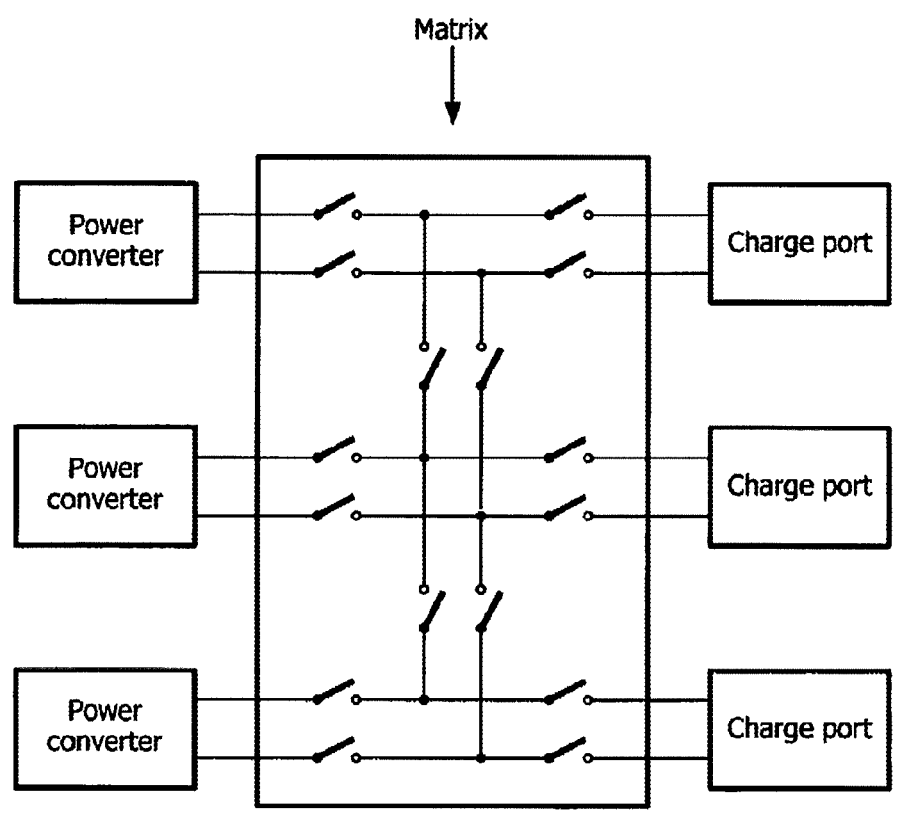
FIG. 9 shows another exemplary with an exemplary implementation of the connection matrix.

FIG. 9 shows another exemplary charging system wherein the power converters are connected with the charge ports by a different embodiment of the switched connection matrix.

FIG. 10 shows three configurations of the charging station with two charge posts in accordance with another exemplary embodiment. For example, as shown in FIG. 10, the first configuration consists of 20 kw modules, the second one of 10 kw modules and the third one can be a combination of both. Each of the converter modules and charge ports are selectable by the switches. The connection managers are implemented in the charge ports, and it also includes a couple of switches which are used for selecting the charging ports. For example, the above mentioned matrix can be distributed over the whole charging configuration. A connection manager can be a device which comprises means for communicating with the electric vehicle and switches for connecting or disconnecting the charge post to the electric vehicle.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A charging system, comprising:
a plurality of charging ports, each with an interface for power exchange with at least one electric vehicle;
a plurality of power converters for converting power from a power source to a desired format for charging the at least one electric vehicle;
a switchable connection matrix for connecting at least one of the plurality of power converters to at least one of the charging ports;
at least one controller for controlling at least one of the plurality of power converters, and/or for controlling a switching operations of the switchable connection matrix and the at least one of the plurality of power converters, and
a communication interface for exchanging parameters with the at least one electric vehicle,
wherein the at least one of the plurality of power converters and the switchable connection matrix are at a remote location from the plurality of charging ports, and
wherein the switchable connection matrix allows the plurality of power converters and the plurality of charging ports to be expanded independently from each other so that a respective number of charging ports and power converters is capable of being different from each other when the charging system is expanded.

2. The charging system according to claim 1, wherein the remote location comprises: the at least one of the plurality of power converters with at least two DC outputs on that same converter.

3. The charging system according to claim 2, wherein the remote location is a transformer house or forms part thereof.

4. The charging system according to claim 2, wherein the remote location comprising:
an energy storage system.

5. The charging system according to claim 4, wherein the energy storage system is battery system, capacitor system or flywheel.

6. The charging system according to claim 5, wherein the at least one of the plurality of power converters is physically arranged below the at least one of the charging ports.

7. The charging system according to claim 4, wherein the at least one controller is an internal controller in the switchable connection matrix to control the operation of said switchable connection matrix.

8. The charging system according to claim 7, wherein the switchable connection matrix can be controlled based on input from an internet connected system or computer implemented method.

9. The charging system according to claim 4, wherein the switchable connection matrix is controllable based on decision rules.

10. The charging system according to claim 9, wherein the controller is coupled to the plurality of power converters via the internet from the remote location.

11. The charging system according to claim 1, wherein the remote location is a transformer house or forms part thereof.

12. The charging system according to claim 1, wherein the remote location comprises: an energy storage system.

13. The charging system according to claim 12, wherein the plurality of power converters and a transformer are located in separate rooms within the remote location.

14. The charging system according to claim 1, wherein the at least one of the plurality of power converters is physically arranged below the at least one of the charging ports.

15. The charging system according to claim 1, wherein the at least one controller is an internal controller in the switchable connection matrix to control the operation of said switchable connection matrix.

16. The charging system according to claim 1, wherein the switchable connection matrix can be controlled based on input from an internet connected system or computer implemented method.

17. The charging system according to claim 14, wherein the switchable connection matrix is controllable based on decision rules.

18. The charging system according to claim 15, wherein the controller is coupled to the plurality of power converters via the internet from a remote location.

19. The charging system according to claim 1, wherein the switchable connection matrix comprises:
a plurality of switch modules,
wherein each of the plurality of switch modules contain two switches configured to be controlled by the controller.

20. The charging system according to claim 1, wherein the switching connection matrix is capable of being expanded by adding switch modules.

21. The charging system according to claim 1, further comprising:
a cable,
wherein the cable connects the remote location and the plurality of charging ports, and the at least one controller controls an output voltage of the plurality of power converters based on a voltage measured at the plurality of charging ports to compensate for a length of the cable connecting the remote location and the plurality of charging ports.

22. The charging system according to claim 1, wherein the plurality of power converters is placed in a climate conditioned room, and heat from the plurality of power converters is utilized to heat systems inside the climate conditioned room in response to a temperature of the climate conditioned room dropping below a certain threshold.

23. The charging system according to claim 1, wherein the plurality of charging ports do not have a common ground, such that in response to a plurality of vehicles being connected to the charging system, the plurality of vehicles are galvanically isolated from each other.

* * * * *